(12) United States Patent
Li et al.

(10) Patent No.: US 12,158,945 B2
(45) Date of Patent: Dec. 3, 2024

(54) AUTHENTICATION CREDENTIAL PROTECTION METHOD AND SYSTEM

(71) Applicant: HUAWEI TECHNOLOGIES CO., LTD., Shenzhen (CN)

(72) Inventors: Ji Li, Shenzhen (CN); Leting Ren, Beijing (CN); Li Duan, Shenzhen (CN); Jun Xia, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 438 days.

(21) Appl. No.: 17/371,712

(22) Filed: Jul. 9, 2021

(65) Prior Publication Data

US 2021/0334356 A1  Oct. 28, 2021

Related U.S. Application Data

(63) Continuation of application No. PCT/CN2020/106442, filed on Jul. 31, 2020.

(30) Foreign Application Priority Data

Jul. 31, 2019  (CN) .......................... 201910703950.3
Sep. 18, 2019  (CN) ......................... 201910880529.X

(51) Int. Cl.
  *G06F 21/45*  (2013.01)
  *G06F 21/31*  (2013.01)
  (Continued)

(52) U.S. Cl.
  CPC .............. *G06F 21/45* (2013.01); *G06F 21/31* (2013.01); *G06F 21/602* (2013.01); *H04L 9/085* (2013.01);
  (Continued)

(58) Field of Classification Search
  None
  See application file for complete search history.

(56) References Cited

U.S. PATENT DOCUMENTS 8,429,760 B2  4/2013  Tribble
8,949,971 B2  2/2015  Tribble
(Continued)

FOREIGN PATENT DOCUMENTS

CN  103246841 A  8/2013
CN  103984904 A  8/2014
(Continued)

OTHER PUBLICATIONS

Keller, Marcel, "FHE-MPC Notes", Dec. 5, 2011 (Year: 2011).*
(Continued)

*Primary Examiner* — William J. Goodchild
(74) *Attorney, Agent, or Firm* — HAUPTMAN HAM, LLP

(57) ABSTRACT

This application provides an authentication credential protection method and system. The protection method includes the following steps: generating authentication secret information based on a lock screen password and hardware secret information of a first device; randomly generating, by the first device, a symmetric key, and using the symmetric key as an encryption key for the authentication secret information; splitting the encryption key into at least two first key segments by using a multi-party data splitting algorithm, where one of the at least two first key segments is stored on the first device; and sending, by the first device, another first key segment to a trusted device. In the foregoing technical solution, the authentication secret information is generated by using the lock screen password and the hardware secret information, increasing information complexity. In addition,
(Continued)

different trusted devices are used to store the split key segments, improving security of the encryption key.

20 Claims, 9 Drawing Sheets

(51) Int. Cl.
    *G06F 21/60*      (2013.01)
    *H04L 9/08*      (2006.01)

(52) U.S. Cl.
    CPC .......... *H04L 9/0869* (2013.01); *H04L 9/0894* (2013.01); *H04L 2209/46* (2013.01)

(56) References Cited

U.S. PATENT DOCUMENTS

| | | | |
|---|---|---|---|
| 9,015,490 | B2 | 4/2015 | Thom et al. |
| 9,455,968 | B1* | 9/2016 | Machani .............. H04L 63/0428 |
| 9,705,908 | B1 | 7/2017 | Thakurta et al. |
| 2002/0007457 | A1* | 1/2002 | Neff ...................... H04L 9/3013 |
| | | | 713/180 |
| 2007/0143824 | A1* | 6/2007 | Shahbazi .............. H04L 63/083 |
| | | | 726/1 |
| 2012/0005747 | A1 | 1/2012 | Tribble |
| 2012/0151223 | A1 | 6/2012 | Conde Marques et al. |
| 2013/0173930 | A1* | 7/2013 | Obligacion ......... G06F 21/6218 |
| | | | 713/193 |
| 2015/0312759 | A1* | 10/2015 | Kim ........................ G06F 21/10 |
| | | | 455/411 |
| 2017/0093805 | A1 | 3/2017 | Proulx et al. |
| 2018/0013557 | A1 | 1/2018 | Jain |
| 2019/0182042 | A1* | 6/2019 | Ebrahimi .............. H04L 9/3234 |

FOREIGN PATENT DOCUMENTS

| | | |
|---|---|---|
| CN | 104102864 A | 10/2014 |
| CN | 104216799 A | 12/2014 |
| CN | 106464973 A | 2/2017 |

OTHER PUBLICATIONS

Ivan Damgard et al, Implementing AES via an Actively/Covertly Secure Dishonest-Majority MPC Protocol, International Conference on Security and Cryptography for Networks, SCN 2012: Security and Cryptography for Networks, total 18 pages.

International Search Report issued in corresponding International Application No. PCT/CN2020/106442, Oct. 22, 2020, pp. 1-10.

European Search Report issued in corresponding European Application No. 20847175.5, dated Dec. 22, 2021, pp. 1-7, European Patent Office, Munich, Germany.

* cited by examiner

Password MPC decryption:
$(PWD \blacklozenge HardSecret) = Enc\_MPC\_AES_{secret\_share}(CipherInfo)$

AUTHENTICATION CREDENTIAL PROTECTION METHOD AND SYSTEM

CROSS-REFERENCE TO RELATED APPLICATIONS

This application is a continuation of International Application No. PCT/CN2020/106442, filed on Jul. 31, 2020, which claims priorities to Chinese Patent Application No. 201910703950.3, filed on Jul. 31, 2019 and Chinese Patent Application No. 201910880529.X, filed on Sep. 18, 2019. All of the aforementioned patent applications are hereby incorporated by reference in their entireties.

TECHNICAL FIELD

This application relates to the field of information security technologies, and in particular, to an authentication credential protection method and system.

BACKGROUND

Information privacy and security in a network environment are very important. Authentication in information use is a common technical means, including a password (authentication credential) for identity authentication, a key for data encryption, and a private key for a digital signature. As a core of information security technology and system, secure storage and secure use of a key are a basis of security of the information security system.

In terms of secure storage, secret information can be stored through trusted hardware devices, and trusted security chips, such as a trusted computing chip, a Trusted Execution Environment (TEE) security chip, and an SGX-based secure running environment, are used to protect data security. However, these technologies are not perfect. For example, hardware-based devices can ensure high security, but if a device that stores secret information is hacked, information leakage may occur. These technologies use a universally unique identifier (UUID) of a device to encrypt a password, scatteredly store a password ciphertext, and collect scattered password files during restoration to decrypt and restore the password. The universally unique identifier (UUID) is stored in a hardware module, and this approach becomes less secure as hardware attack techniques improve. In recent years, cases of hardware side-channel cracking have been repeatedly reported, proving that security of trusted hardware is also risky. In addition, hardware security protection measures have disadvantages such as high costs, slow upgrade, and difficult patch installation.

Alternatively, the secret information can be securely stored on a backup device through white-box encryption. White-box encryption can increase attack difficulty, but security of white-box encryption is not ideal.

On the other hand, the secret information may be scatteredly stored on a plurality of devices to implement security protection. This reduces a risk of secret information leakage when a device is hacked.

In terms of secure use, a secure multi-party computation technology can be used to resolve the collaborative computing problem that protects privacy among a group of distrusted participants, and prevent input values from being leaked to other participants participating in the computing. Alternatively, a secret sharing technology may be used. To be specific, confidential content is split in an appropriate manner, and each split share is managed by a different participant. A single participant cannot restore all secret information, and a secret information can be restored only when several participants collaborate with each other.

Therefore, as information technologies develop, more secure, reliable, and cost-effective privacy protection technologies are emerging.

SUMMARY

This application provides an authentication credential protection method and system, to improve information security.

According to a first aspect, an authentication credential protection method is provided. The protection method includes the following steps: generating authentication secret information based on a lock screen password and hardware secret information of a first device; randomly generating, by the first device, a symmetric key, and using the symmetric key as an encryption key for the authentication secret information; encrypting the authentication secret information by using the encryption key, and storing the authentication secret information on the first device; splitting the encryption key into at least two first key segments by using a splitting algorithm, where one of the at least two first key segments is stored on the first device; and sending, by the first device, another first key segment to a trusted device. In the foregoing technical solution, the authentication secret information is generated by using the lock screen password and the hardware secret information, increasing information complexity. In addition, different trusted devices are used to store the split key segments, improving security of the encryption key.

In a specific implementation, the splitting algorithm is a secure multi-party data splitting algorithm. The encryption key is split and scatteredly stored, improving security of the encryption key.

In a specific implementable solution, the sending, by the first device, another first key segment to a trusted device is specifically:

the trusted device includes a second device and a third device, and there are three first key segments; sending, by the first device, two key segments of the three key segments in a one-to-one correspondence to the second device and the third device for storage; or the trusted device includes a second device, and there are two first key segments; sending, by the first device, one first key segment to the second device.

In a specific implementation, the first device is a mobile terminal, the second device is a cloud service, and the third device is a trusted mobile terminal.

In a specific implementation, the first device is connected to the trusted device through a secure channel. This facilitates secure information transfer between the first device and the trusted device.

In a specific implementation, the method further includes: performing user identity information authentication on the trusted device, and after a user identity information is determined, receiving the first key segment sent by the first device. This ensures security of the first key segment stored on the trusted device.

In a specific implementation, the method further includes: performing secure multi-party computation between the trusted device and the first device by using the first key segments respectively stored on the trusted device and the first device as key division input to the secure multi-party computation, and decrypting the authentication secret information on the first device.

In a specific implementation, the method further includes: before performing the multi-party computation, performing the user identity information authentication on the trusted device, and after the user identity information is determined, performing the secure multi-party computation between the trusted device and the first device by using the first key segments respectively stored on the trusted device and the first device as the key division input to the secure multi-party computation. User identity information is authenticated, improving information security.

In a specific implementation, the method further includes: resetting the lock screen password, and generating new authentication secret information based on the reset lock screen password and the hardware secret information of the first device.

In a specific implementation, the method further includes: randomly generating, by the first device, a new symmetric key, and using the new symmetric key as a new encryption key for the new authentication secret information; and transferring the old authentication secret information and the new authentication secret information to a TEE as parameters, the TEE compares the old authentication secret information with the stored authentication secret information, and if the two pieces of authentication secret information match, the TEE replaces the stored authentication secret information with the new authentication secret information.

In a specific implementation, randomly generating, by the first device, the new symmetric key, and using the new symmetric key as the new encryption key for the new authentication secret information; splitting the new encryption key into at least two second key segments by using the splitting algorithm, where one second key segment of the at least two second key segments is stored on the first device; and send, by the first device, another second key segments to the trusted device. After the new lock screen password is set, the new symmetric key and the second key segment are reset, to protect the new authentication secret information of the first device.

In a specific implementation, the hardware secret information includes a hard disk serial number, a CPU serial number, or a factory serial number of the first device, and special information in a hardware SOC chip. This improves security of the authentication secret information.

According to a second aspect, an authentication credential protection system is provided, and the system includes:

a first device, including a first processing module, configured to generate authentication secret information based on a lock screen password and hardware secret information of a first device; randomly generate a symmetric key, and use the symmetric key as an encryption key for the authentication secret information; and split the encryption key into at least two first key segments by using a splitting algorithm; a first storage module, configured to store the encrypted authentication secret information and one key segment of the at least two first key segments; a first communications module, configured to send another first key segment to a trusted device; and the trusted device, where the trusted device is configured to receive and store the first key segment sent by the first device. In the foregoing technical solution, the authentication secret information is generated by using the lock screen password and the hardware secret information, increasing information complexity. In addition, different trusted devices are used to store the split key segments, improving security of the encryption key.

In a specific implementation, the splitting algorithm is a secure multi-party data splitting algorithm. The encryption key is split by using a secure multi-party algorithm and is stored on different devices, improving security of the encryption key.

In a specific implementable solution, the trusted device includes a second device and a third device. Different trusted devices may be used to store the first key segment.

In a specific implementation, the trusted device includes a second communications module, and the first communications module and the second communications module are connected through a secure channel.

In a specific implementation, the trusted device includes: an authentication module, configured to authenticate user identity information; and the second communications module is further configured to: after the user identity information is determined, receive the first key segment sent by the first device. This improves security of information transmission.

In a specific implementation, the trusted device includes a second processing module; the first processing module and the second processing module perform secure multi-party computation of Advanced Encryption Standard (MPC_AES) between the trusted device and the first device by using the first key segment stored on the trusted device and the first device as key division input to the secure multi-party computation, and decrypt the authentication secret information on the first device. By using secure multi-party computation, a forgotten lock screen password on a first device is decrypted and a new lock screen password is re-entered. Therefore, the first device can reset the lock screen password without restoring to factory settings, avoiding a case in which data of the first device is lost.

In a specific implementation, the first processing module is further configured to reset the lock screen password, and generate new authentication secret information based on the reset lock screen password and the hardware secret information of the first device. The new authentication secret information is generated based on the new lock screen password.

In a specific implementable solution, the first processing module is further configured to randomly generate a new symmetric key, and encrypt the new symmetric key as a new encryption key for the new authentication secret information; and transfer the old authentication secret information and the new authentication secret information to a TEE as parameters, the TEE compares the old authentication secret information with the stored authentication secret information, and if the two pieces of authentication secret information match, the TEE replaces the stored authentication secret information with the new authentication secret information.

In a specific implementable solution, the first processing module is further configured to split the new encryption key into at least two second key segments by using the splitting algorithm, where one of the at least two second key segments is stored on the first device; and send, by the first device, another second key segment to the trusted device. After the new lock screen password is entered, a new symmetric key and a new second key segment are regenerated, to protect the new authentication secret information of the first device.

DESCRIPTION OF EMBODIMENTS

In the embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one (piece) of a, b, or c may indicate a, b, c, a and b, a and c, b and c, or a, b, and c, where a, b, and c may be singular or plural.

Figure 1:
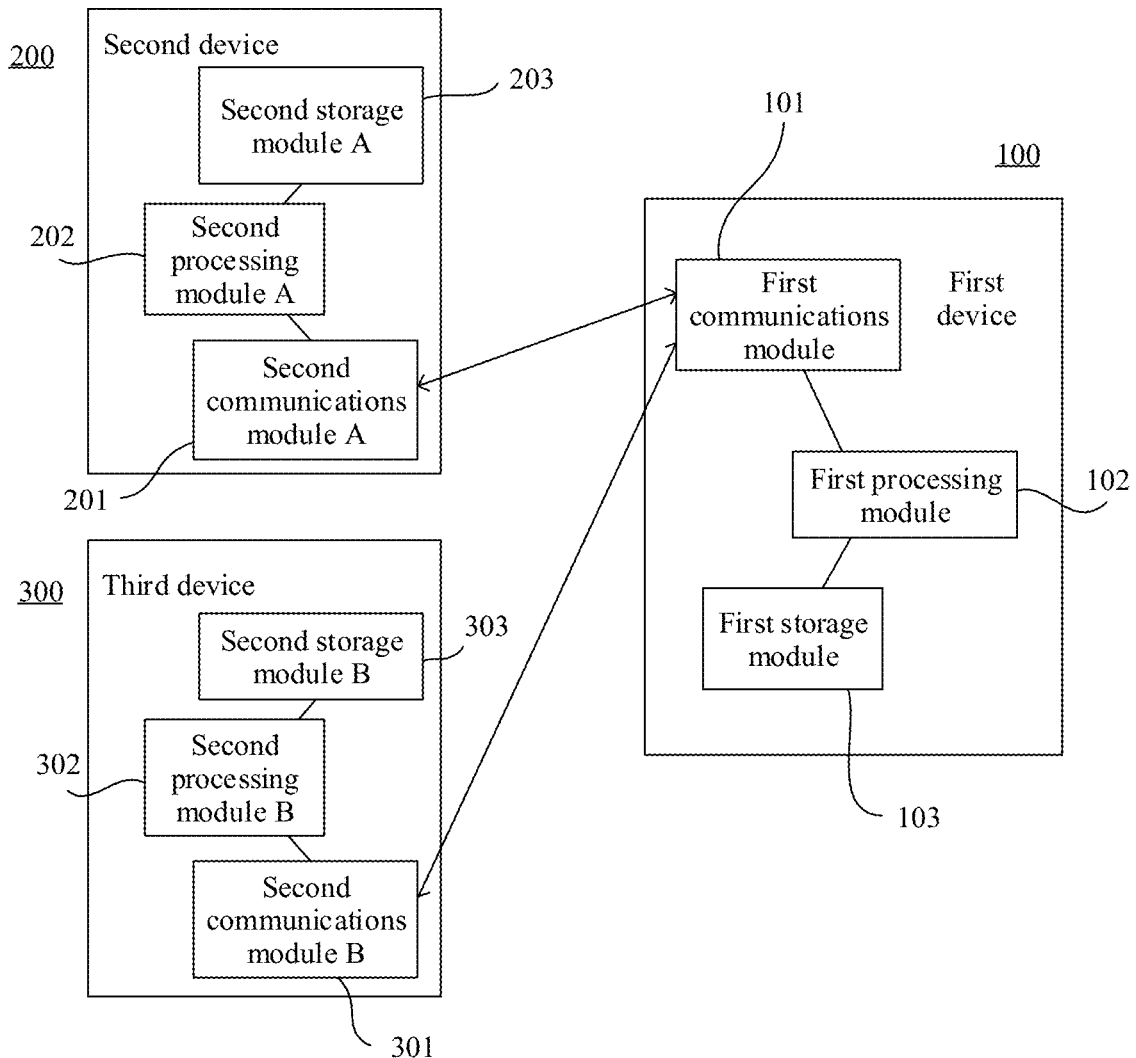
FIG. 1 is a block diagram of a structure of an authentication credential protection system according to an embodiment of this application.

FIG. 1 is a diagram of a system architecture to which an embodiment of this application is applicable. As shown in FIG. 1, a system architecture in this embodiment of this application includes a first device, a second device, and a third device.

Still refer to FIG. 1. The first device is a reset device, to be specific, a device that is to be restored after a lock screen password is forgotten, and may specifically be a terminal. The terminal in the embodiments of this application may also be referred to as terminal equipment (terminal equipment), user equipment (user equipment, UE), or the like. For example, the terminal may be a mobile phone, a tablet computer (pad), a laptop, a personal digital assistant (personal digital assistant, PDA), a point of sales (point of sales, POS), a vehicle-mounted computer, a smart speaker, a set-top box, an augmented reality (augmented reality, AR) device, virtual reality (virtual reality, VR), a smart car, or the like. This is not limited in the embodiments of this application. In addition, the terminal in the embodiments of this application may support one or more applications. For example, one or more of a drawing application, a presentation application, a word processing application, a game application, a telephony application, a video player application, a music player application, an email application, an instant message receiving and sending application, a photo management application, a camera application, a browser application, a calendar application, a clock application, a payment application, and a health management application. A user may install a corresponding application on the terminal based on a request from the user.

Refer to FIG. 1. FIG. 1 shows a schematic diagram of a structure of a reset device according to an embodiment of this application. The first device 100 includes a first processing module 102, a first storage module 103, and a first communications module 101.

The first storage module 103 stores a lock screen password of the first device 100 and hardware secret information of the first device 100. The first storage module 103 may be a hard disk in the first device 100, or another chip having a storage function. The hardware secret information of the first device 100 includes but is not limited to: a hard disk serial number, a CPU serial number, or a factory serial number of the first device 100, or special information in a hardware SOC chip, which is invisible and unreadable to an application program.

Still refer to FIG. 1. The first processing module 102 of the first device 100 is configured to process the lock screen password and the hardware secret information. The first processing module 102 may be a CPU in the first device 100, or another chip having a calculation function in the first device 100. When being used, the first processing module 102 generates authentication secret information based on the lock screen password and the hardware secret information of the first device 100. During specific composition, the first processing module 102 combines the lock screen password and the hardware secret information to generate the authentication secret information. For example, the lock screen password is a combination A of six digits or letters. A hardware password module stores secret information (a group of random numbers that are not stored in the hardware password module and are regenerated when a mobile phone is restored to factory settings) and the lock screen password for HMAC calculation. An output result is used as the authentication secret information.

The first processing module 102 encrypts the generated authentication secret information. Specifically, the first processing module 102 randomly generates a symmetric key. The symmetric key is used as an encryption key for the authentication secret information to encrypt the authentication secret information. When specifically generating the symmetric key, the first processing module 102 may randomly generate the symmetric key based on the hardware password module, and encrypt the authentication secret information.

After encrypting the authentication secret information, the first processing module 102 sends the encrypted authentication secret information to the first storage module 103 for storage.

The first processing module 102 is further configured to split the encryption key into at least two first key segments by using a splitting algorithm. The split first key segments may be stored on different devices. The following first describes how to split the encryption key.

The splitting algorithm specifically used by the first processing module 102 is a secure multi-party data splitting algorithm, and the secure multi-party splitting algorithm is a computing framework formed based on basic operations such as multi-party addition and multi-party multiplication. If an SPDZ2 multi-party computing framework is used, which is launched by Professor Nigel .P. Smart of the University of Bristol in 2017. For details, see SPDZ-2 at bristolcrypto on github.com. Alternatively, refer to the document Implementing AES via MPC written by Professor Nigel .P. Smart. This document describes principles of implementing an AES algorithm through multi-party computation. This document can be viewed as Lecture 9 of Nigel .P. Smart's (~nsmart) FHE-MPC Advanced Graduate Course at home.esat.kuleuven.be. The SPDZ2 multi-party computing framework encapsulates basic multi-party operator operations such as multi-party addition, multiplication, bitwise operation, and logical comparison. On the basis of the multi-party computing framework, functions such as automatic splitting of input data are implemented based on a quantity of multi-party computation participants. According to programming language specifications (Python-like), a programmer compiles multi-party computing script files (MPC files for short) with special functions by using a sint/sfloat multi-party security type, and use an SPDZ2 framework compiler to compile the MPC files into multi-party executable files (byte code files). By independently loading and executing the compiled byte code, a multi-party computing participant can complete a specific function jointly executed by a plurality of participants, for example, a multi-party computation MPC_AES decryption function provided in this embodiment of this application.

For ease of understanding of splitting the encryption key, that the first processing module 102 generates a 16-byte random number as a key AES_KEY of an AES symmetric cryptographic algorithm is used as an example. The first processing module 102 splits the encryption key based on the SPDZ2 multi-party computing framework: splitting the AES_KEY into random key segments AES_KEY1, AES_KEY2, . . . , and AES_KEYn. The random key segments meet the following condition: AES_KEY=AES_KEY1+AES_KEY2+ . . . +AES_KEYn, where n is a positive integer, and n is the quantity of participants in the multi-party computation. In the system shown in FIG. 1, there are three multi-party computation participants. Therefore, n=3. The AES_KEY is split into random segments AES_KEY1, AES_KEY2, and AES_KEY3 that satisfy the foregoing equation. AES_KEY1, AES_KEY2, and AES_KEY3 are three first key segments.

The first processing module 102 distributes AES_KEY1 to a multi-party computation participant party_1, distributes AES_KEY2 to a multi-party computation participant party_2, and so forth, and distributes AES_KEYn to a multi-party computation participant party_n. In the system framework shown in FIG. 1, devices that participate in the multi-party computation include the first device 100, the second device 200, and the third device 300. The first device 100 is party_1, the second device 200 is party_2, and the third device 300 is party_3. In addition, the second device 200 and the third device 300 are trusted devices. The trusted device is a device that can be operated by a user corresponding to the first device 100 when the second device 200 and the third device 300 are running.

When AES_KEY1 is stored on the first device 100, AES_KEY1 is stored on the first storage module 103.

When sending AES_KEY2 and AES_KEY3 to the second device 200 and the third device 300, the first processing module 102 sends AES_KEY2 and AES_KEY3 to the second device 200 and the third device 300 in a one-to-one correspondence through the first communications module 101. The first communications module 101 may be a communications functional module on the terminal device.

The second device 200 is a cloud service, and is used as a multi-party computation participant. As shown in FIG. 1, FIG. 1 is a schematic diagram of a structure of the second device 200. The trusted device includes an identity authentication module, a second communications module, a second processing module, and a second storage module.

First, the authentication module disposed on the second device 200 is configured to authenticate user identity information. The authentication module may be a common authentication module such as an account password authentication module and an SMS message authentication module. If the authentication module is set to password authentication, a user enters an account and a password to log in to a cloud service to verify user authenticity. In addition, after authenticity of the cloud service is verified, a second communications module A201 is connected to the first communications module 101, to establish a secure channel to enable the first device 100 to communicate with the second device 200.

When the first processing module 102 sends AES_KEY2 through the first communications module 101, the second communications module A201 receives AES_KEY2 sent by the first device 100.

The second communications module A201 is connected to a second storage module A203 and a second processing module A202, where the second processing module A202 is a common data processing module. When in use, the second processing module A202 stores AES_KEY2 received by the second communications module A201 in the second storage module A203. In addition, the second processing module A202 may be further configured to participate in the multi-party computation to restore the reset device.

The third device 300 is a trusted terminal, and the trusted terminal may be a terminal device of a same type as the first device 100, for example, a device such as a mobile phone or a tablet computer. The third device 300 is also used as a multi-party computation participant. As shown in FIG. 1, FIG. 1 is a schematic diagram of a structure of the third device 300. The trusted device includes an authentication module, a second communications module, a second processing module, and a second storage module.

First, the authentication module disposed on the third device 300 is configured to authenticate user identity information. The authentication module may be a common authentication module such as a fingerprint authentication module, a face authentication module, or a password authentication module. If the authentication module is set to fingerprint authentication or face authentication, the third device 300 collects a face or a fingerprint image of a user and compares the face or the fingerprint image with a stored face or fingerprint feature. If a result is matched, user authenticity is verified. The second communications module B301 is connected to the first communications module 101, to establish a secure channel to enable the first device 100 to communicate with the third device 300.

When the first processing module 102 sends AES_KEY3 through the first communications module 101, the second communications module B301 receives the first key segment sent by the first device 100.

The second communications module B301 is connected to the second storage module B303 and the second processing module B302, where the second processing module B302 is a common data processing module. When in use, the second processing module B302 stores AES_KEY3 received by the second communications module B301 in the second storage module B303. In addition, the second processing module B302 may be further configured to participate in the multi-party computation to restore the reset device.

To be specific, when three-party computation MPC_AES is performed, the first processing module 102 uses AES_KEY1 as input, the second processing module A202 uses AES_KEY2 as input, and the second processing module B302 uses AES_KEY3 as input, to perform the multi-party computation. In addition, a ciphertext of the authentication secret information is added to the multi-party computation. The multi-party computation is also performed based on the foregoing SPDZ2 multi-party computing framework, to perform secure multi-party computation between the trusted device and the first device 100 to decrypt the authentication secret information.

The first processing module 102 of the first device 100 is further configured to: after the lock screen password is forgotten, the user of the first device 100 may reset the lock screen password. The first processing module 102 is further configured to: when the lock screen password is reset, generate new authentication secret information based on the reset lock screen password and the hardware secret information of the first device 100, encrypt the new authentication secret information, and store the encrypted new authentication secret information on the first device 100. For the foregoing handling process of the first processing module 102, refer to the foregoing specific description. Details are not described herein again.

In addition, after the lock screen password is reset, the first device 100 performs the foregoing encryption again to form an encryption key and the like. Specifically, the first processing module 102 is further configured to randomly generate a new symmetric key, and use the new symmetric key as a new encryption key for the new authentication secret information. The new authentication secret information may be encrypted by using the encryption key.

The first processing module 102 of the first device 100 is further configured to: after the authentication secret information is decrypted, transfer the old authentication secret information and the new authentication secret information to a TEE as parameters, the TEE compares the old authentication secret information with the stored authentication secret information, and if the two pieces of authentication secret information match, the TEE replaces the stored authentication secret information with the new authentication secret information.

In addition, after the new authentication secret information replaces the old authentication secret information, the first processing module 101 further splits the new encryption key into at least two second key segments by using the splitting algorithm. One of the at least two second key segments is stored on the first device 100. The first device 100 sends another second key segment to the trusted device. For details of the foregoing process, refer to the foregoing description about the first processing module 102. Details are not described herein again.

After the first processing module 102 starts resetting the lock screen password, an embodiment of this application further provides an authentication information protection method. Specific steps include:

Step 001: Generate authentication secret information based on a lock screen password and hardware secret information of the first device 100.

Step 002: The first device 100 randomly generates a symmetric key, and uses the symmetric key as an encryption key for the authentication secret information.

Step 003: Encrypt the authentication secret information by using the encryption key and store the encrypted authentication secret information on the first device 100.

Step 004: Split the encryption key into at least two first key segments by using a splitting algorithm, where one of the at least two first key segments is stored on the first device 100; and the first device 100 sends another first key segment to a trusted device.

Specifically, the first device 100 sends the key segment in the at least two first key segments in a one-to-one correspondence to the second device 200 and the third device 300 for storage.

During specific transmission, the first device 100 is connected to the trusted device through a secure channel, to ensure secure data transmission between the first device 100 and the trusted device.

In addition, user identity information authentication is performed on the trusted device, and after user identity information is determined, the first key segment sent by the first device 100 is received. This ensures security of the first key segment stored on the trusted device.

Step 005: Perform secure multi-party computation between the trusted device and the first device 100 by using the first key segments respectively stored on the trusted device and the first device 100 as key division input to the secure multi-party computation, and decrypt the authentication secret information on the first device.

Specifically, the user identity information authentication is performed on the trusted device, and after the user identity information is determined, the first key segments respectively stored on the trusted device and the first device 100 is used as key division input to the secure multi-party computation. A ciphertext of the authentication secret information is also added to the secure multi-party computation. The secure multi-party computation is performed between the trusted device and the first device 100.

Step 006: Reset the lock screen password.

Step 007: When resetting the lock screen password, generate new authentication secret information based on the reset lock screen password and the hardware secret information of the first device 100.

Step 008: The first device 100 randomly generates a new symmetric key, and uses the new symmetric key as a new encryption key for the new authentication secret information.

Step 009: Transfer the authentication secret information obtained through decryption (old authentication secret information) and the new authentication secret information to a TEE security functional module. The authentication secret information stored in a TEE is compared with the input old authentication secret information. When the two pieces of authentication secret information match, the authentication secret information stored in the TEE is replaced with the input new authentication secret information.

Step 010: Split the new encryption key into at least two second key segments by using the splitting algorithm.

One of the at least two second key segments is stored on the first device. The first device sends another second key segment to the trusted device.

Figure 2:
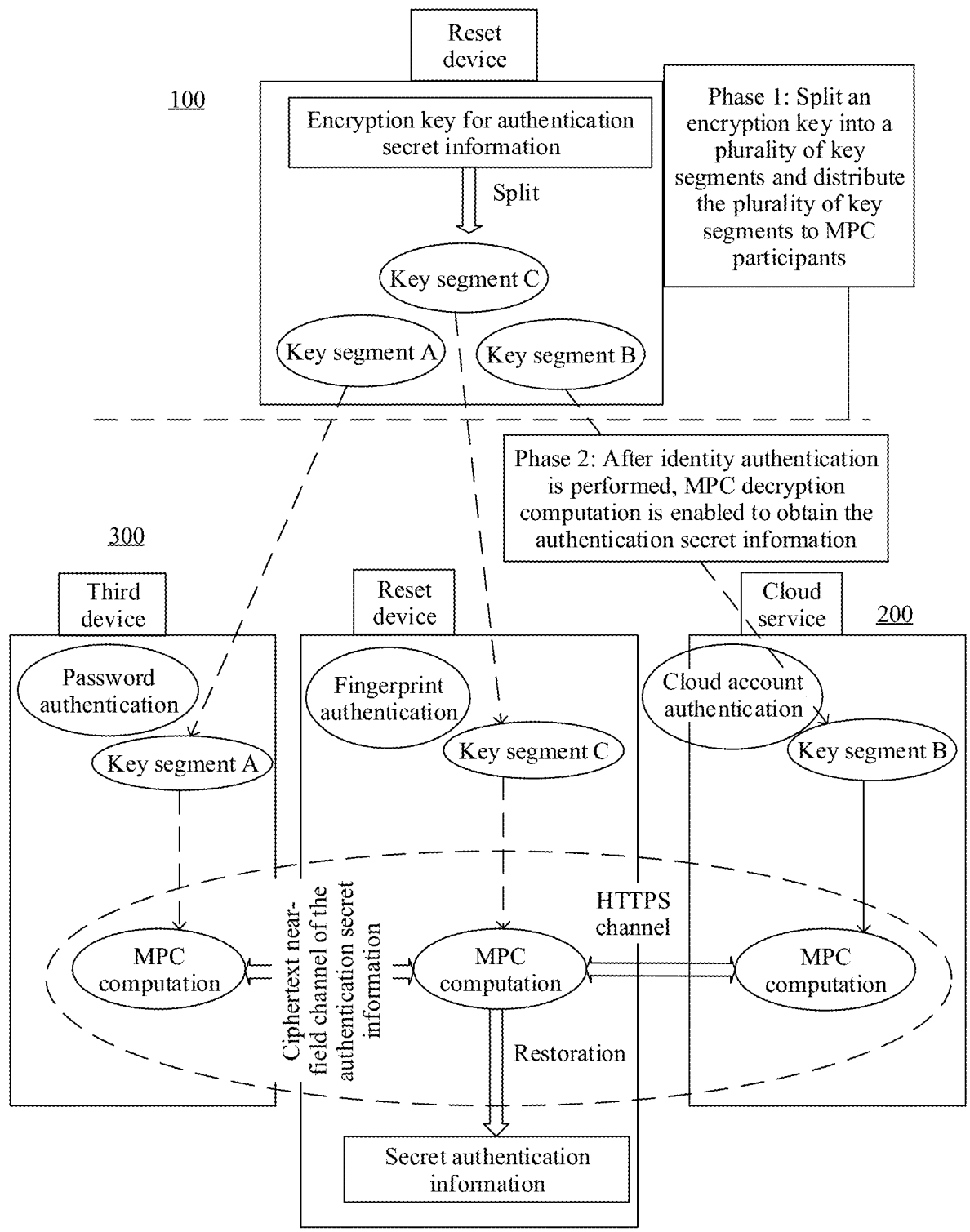
FIG. 2 is a schematic flowchart of authentication credential protection according to an embodiment of this application.

For ease of understanding the foregoing method, the following provides description with reference to some scenarios. For example, in a typical scenario, if a user forgets a lock screen password of a smartphone, the user can only restore the smartphone to factory settings, and the user reset a new lock screen password. However, original user data saved on the mobile phone is cleared and cannot be accessed. The user may back up the lock screen password to a cloud for storage. However, there is also a risk of leakage on the cloud, and the user device may be unlocked. The following describes in detail the process of setting and resetting a password of an intelligent terminal. As shown in FIG. 2, the method mainly includes two main processes:

Secret information (key) generation process: A key segment A, a key segment B, and a key segment C are three key segments obtained by splitting an encryption key. The three key segments are scatteredly stored to an auxiliary computing party, and the auxiliary computing party jointly implements secure restoration or uses secret information. The auxiliary computing party may include a third device and a cloud service, and a user identity is authenticated by using a local account and a cloud account of the third device.

Secret information (key) use process: A specified auxiliary computing party restores authentication secret information by using key segments through multi-party computation. A computing result of the secret information is invisible to other parties. Identification information of the auxiliary computing party is shared among auxiliary computing parties, and more auxiliary computing parties can still be added after the secret information is scatteredly stored.

Figure 3:
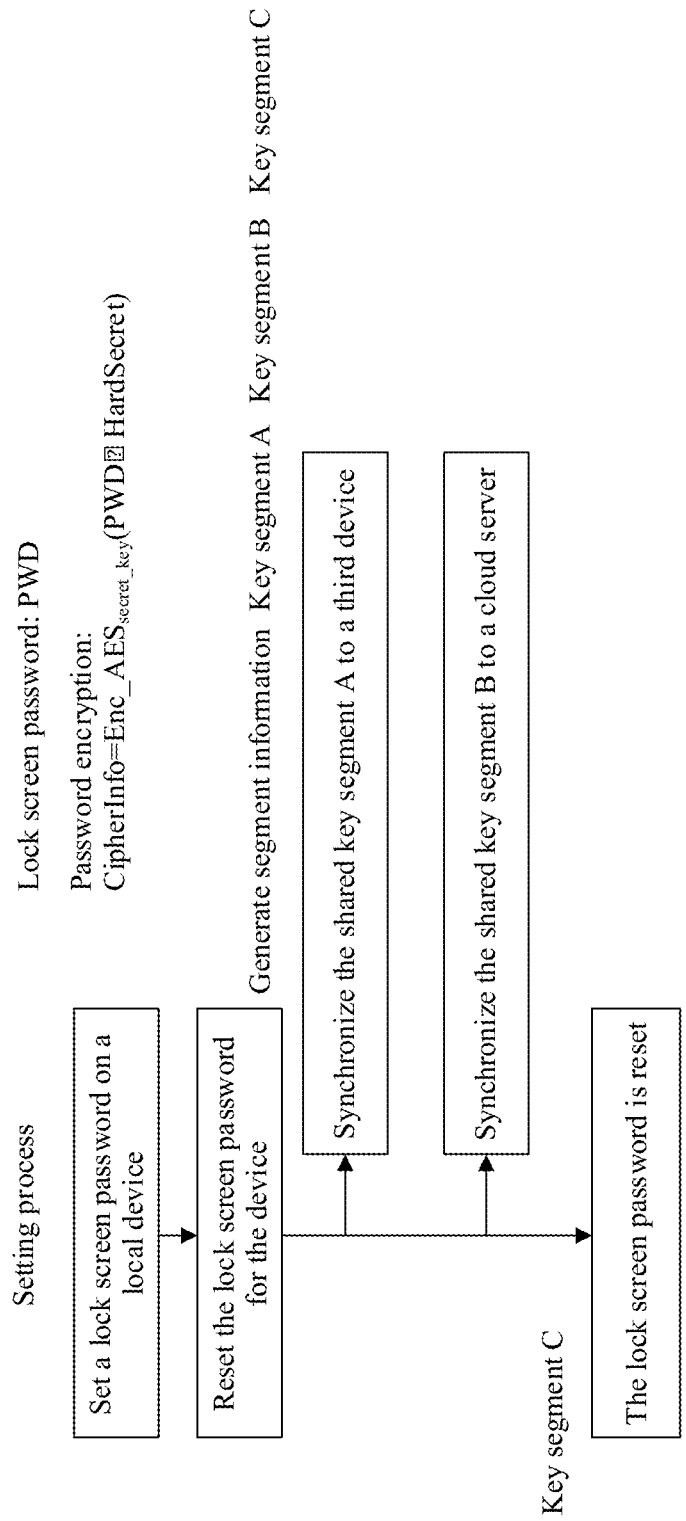
FIG. 3 is a flowchart of setting a lock screen password of a first device according to an embodiment of this application.

The following first describes the process of setting the lock screen password:

In the process shown in FIG. 3, after the user enters the lock screen password usrPWD in a user interface of the intelligent terminal, the lock screen password and the hardware secret information of the intelligent terminal generate the authentication secret information.

The intelligent terminal randomly generates a symmetric key, and uses the symmetric key as an encryption key for the authentication secret information to encrypt the authentication secret information, and saves a ciphertext on the intelligent terminal.

By using a multi-party key splitting algorithm, the encryption key is split into three first key segments: share_key_a (key segment A), share_key_b (key segment B), and share_key_c (key segment C).

The first key segment share_key_a is synchronized to a terminal device, the first key segment share_key_b is synchronized to a cloud service, and the first key segment share_key_c is stored on a reset device.

When the user forgets the lock screen password and has to reset the new password, the terminal device and the reset device (mobile phone) separately load key segments stored by the terminal device and the reset device (mobile phone), enable a secure three-party computation function, and restore the authentication secret information (also referred to as the old authentication secret information) on the reset device (mobile phone). In addition, the new lock screen password and hardware secret information generate new authentication secret information.

Figure 4:
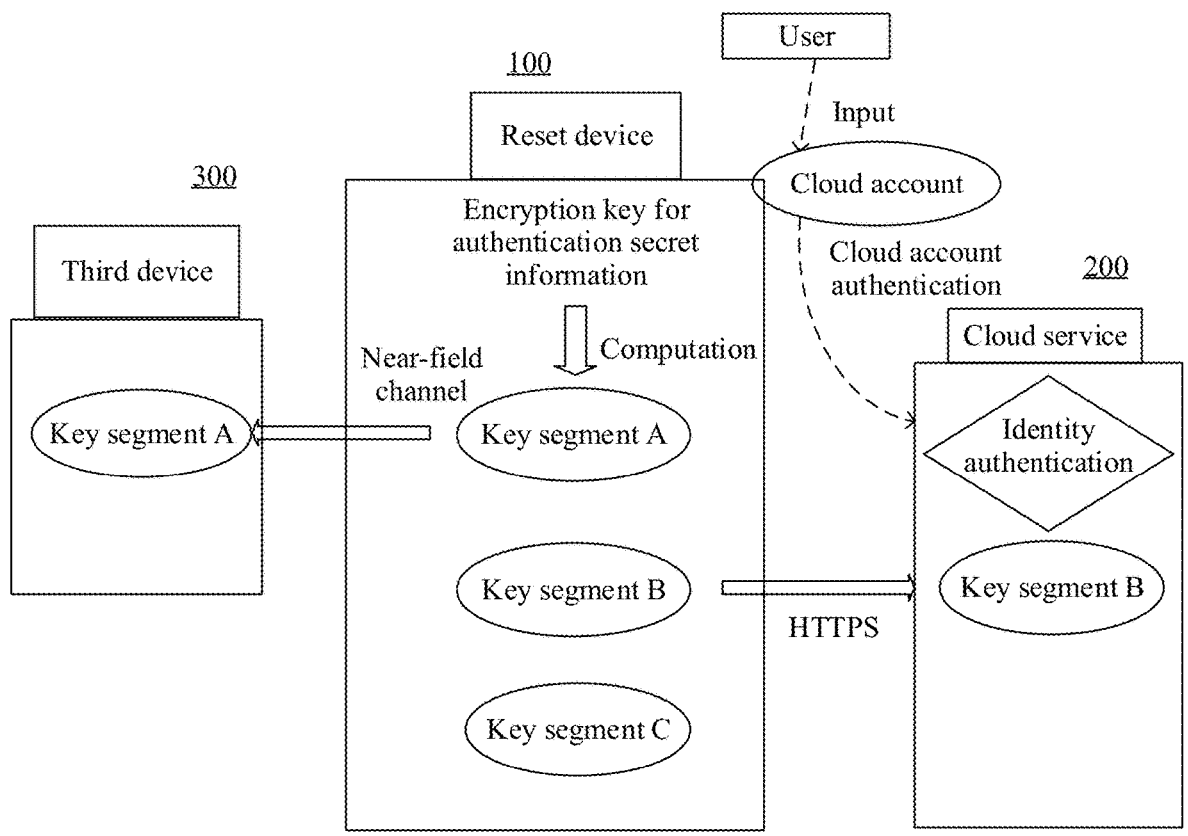
FIG. 4 is a flowchart of information exchange in an authentication credential protection system according to an embodiment of this application.

Refer to FIG. 3 and FIG. 4. The local device refers to a reset device, and a specific process thereof is as follows:

The following first describes an encryption key splitting phase:

The reset device, a terminal device, and a cloud service participate in storage of key segment information.

The terminal device (PC or mobile phone) establishes a connection channel (through Bluetooth or WLAN) with the reset device.

In a local operation scenario, a connection channel is established, and a unidirectional HTTPS security channel (cloud service authentication) is established between the reset device and the cloud service.

After a user enters a cloud account and password on the reset device, the cloud account and password are transmitted to the cloud service through HTTPS for identity authentication (user authentication).

The user enters a lock screen password on the reset device, the lock screen password and hardware secret information generate authentication secret information. A symmetric key is randomly generated as an encryption key for the authentication secret information, the encryption key is used to encrypt the authentication secret information, and an obtained ciphertext of the authentication secret information is stored on the reset device. The encryption key is split into three key segments: share_key_a/ share_key_b/ share_key_c. share_key_a/ share_key_b/share_key_c is respectively stored on a mobile phone (reset device), a third device (trusted mobile phone or trusted PC), or the cloud service.

After the terminal device (mobile phone) receives share_key_a, a dialog box is displayed, prompting the user to reject or accept. Alternatively, after the terminal device (PC) receives share_key_a, a dialog box is displayed, prompting the user (to enter a protection password).

After obtaining authorization from the user, the terminal device authenticates a signature of the first key segment share_key_a, and stores the first key segment share_key_a on a terminal device after encryption (a hardware key or the protection password is encrypted).

After receiving share_key_b, the cloud service authenticates a signature of share_key_b, and stores share_key_b in a cloud database after encryption. share_key_c is stored in a dedicated storage area RPMB of the reset device or on an REE side after encryption.

Then, the following describes an authentication secret information restoration phase.

The reset device, the terminal device, and the cloud service participate in the storage of the key segment information.

The terminal device (PC or mobile phone) establishes the connection channel (through Bluetooth or WLAN) with the reset device.

Figure 5:
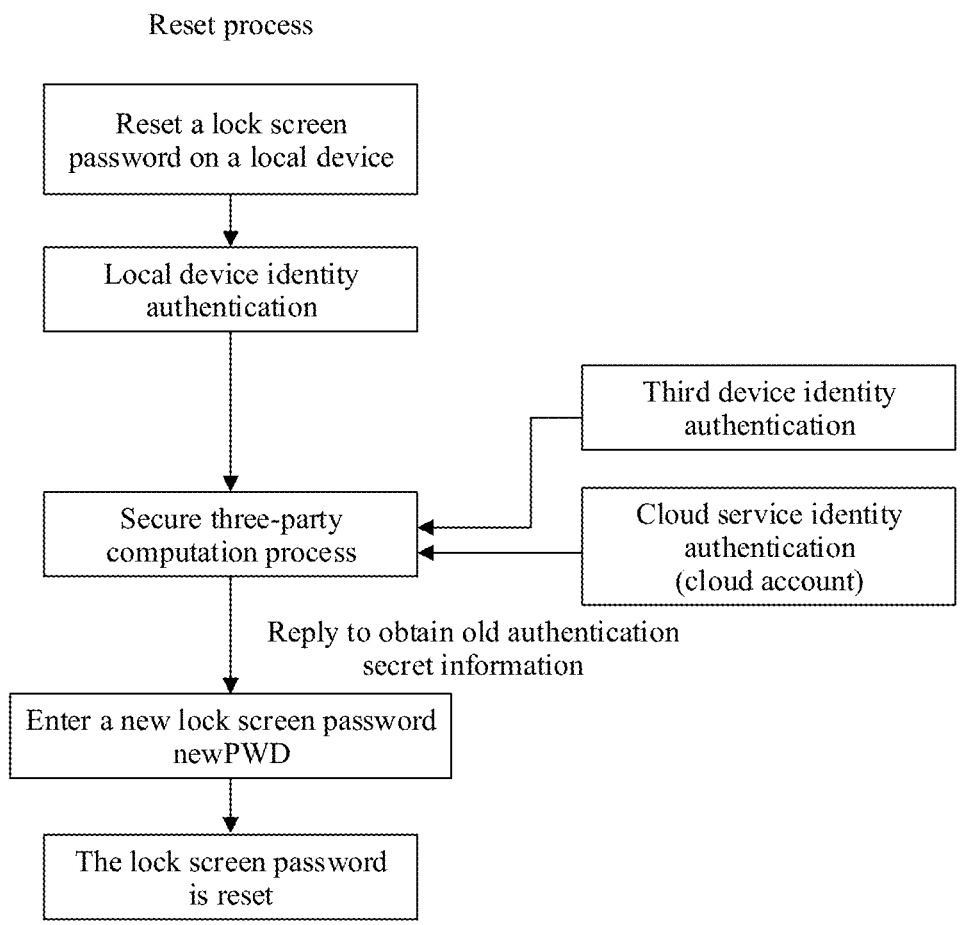
FIG. 5 is a flowchart of decrypting authentication secret information according to an embodiment of this application.

Refer to FIG. 5. A lock screen password resetting process is as follows, where the local device in FIG. 5 refers to a reset device.

To reset a device, fingerprint information of a user has to be authenticated. The next process of resetting a lock screen password can be started only after the fingerprint information is authenticated.

After the device authenticates that the lock screen password, a fingerprint, or a face is correct, a cloud service authenticates that an account and password are correct.

A process of secure multi-party computation is started, to restore (decrypt) authentication secret information on the reset device.

The detailed process is as follows:

In a local operation scenario, a secure connection channel is established, and a unidirectional HTTPS security channel (cloud service authentication) is established between the reset device and the cloud service.

After the user enters a cloud account and password on the reset device, the cloud account and password are transmitted to the cloud service through HTTPS for identity authentication (user authentication).

The cloud service authenticates the user account and password, enables MPC computation, and waits for the other two parties to participate in the multi-party computation.

After a terminal device password (trusted mobile phone lock screen password or trusted PC protection password) is authenticated, the MPC computation is enabled to wait for the other two parties to participate in the multi-party computation.

After the fingerprint of the reset device is authenticated, the MPC computation is enabled. The three parties officially start decryption computation MPC_AES (based on an SPDZ2 multi-party computation framework). The reset device is on an REE side, and the authentication secret information is restored (decrypted). The restored authentication secret information is used as an old authentication secret information.

The user enters a new lock screen password in a user interface, and obtains new authentication secret information after the new lock screen password and hardware secret information are computed. The old authentication secret information and the new authentication secret information are transferred to a trusted execution environment (Trusted Execution Environment, TEE) as parameters, and a new authentication credential is updated (and the lock screen password is indirectly updated).

It can be learned from the foregoing description that in the system provided in this embodiment of this application, when the user forgets the lock screen password and has to reset the lock screen password, the mobile phone does not have to be restored to factory settings, and original data of the user can continue to be accessed. After a secure three-party computation function is enabled, the old authentication secret information can be restored only on a restoration device (mobile phone). The cloud service and the terminal device cannot restore the old authentication secret information. In this way, the user can set the new lock screen password, the mobile phone does not have to be restored to factory settings, and the user can continue to access the original data. In addition, the multi-party MPC_AES decryption algorithm is introduced in the process of protecting and restoring the authentication secret information, to ensure that the authentication secret information is not leaked in the computation process, and can only be restored on the reset device. Other parties cannot obtain the authentication secret information through computation.

Figure 6:
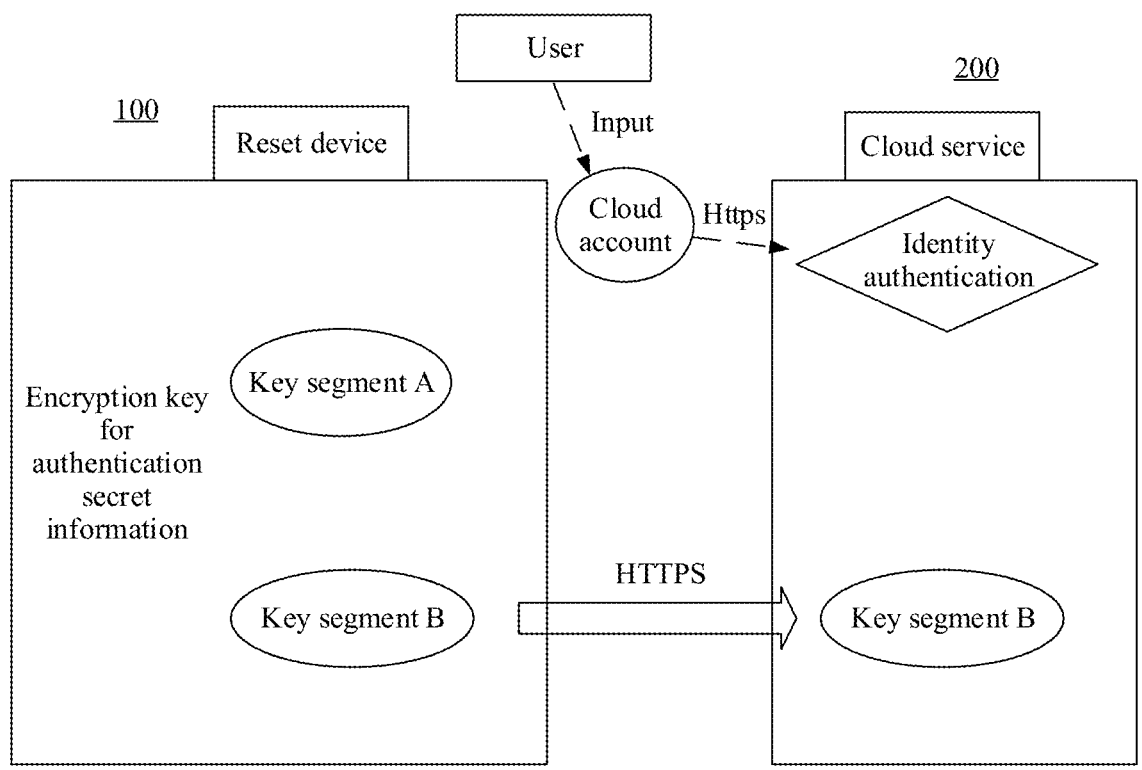
FIG. 6 is a flowchart of splitting an encryption key of an authentication credential protection system according to an embodiment of this application.

As shown in FIG. 6, FIG. 6 shows another system architecture according to an embodiment of this application. A system architecture in this embodiment of this application includes a first device 100 and a second device 200.

The first device 100 is the reset device in FIG. 1, and the second device 200 is a cloud service. In addition, structures of the first device 100 and the second device 200 are the same as the foregoing structures. A difference only lies in that the first device 100 splits an encryption key into two parts, but during storage, the two first key segments are respectively stored on the first device 100 and the second device 200. The first device 100 stores one first key segment, and the second device 200 stores one first key segment. The detailed process is as follows:

A unidirectional HTTPS security channel (cloud service authentication) is established between the reset device and the cloud service.

After the user enters a cloud account and password on the reset device, the cloud account and password are transmitted to the cloud service through HTTPS for identity authentication (user authentication).

The user enters the lock screen password on the reset device, the lock screen password and hardware secret information generate authentication secret information. A symmetric key is randomly generated as an encryption key for the authentication secret information, the encryption key is used to encrypt the authentication secret information, and an obtained ciphertext is stored on the reset device.

The encryption key is split into two first key segments: share_key_a /share_key_b. The first key segments are respectively stored on the mobile phone (reset device) and the cloud service.

After receiving the first key segment share_key_b, the cloud service authenticates a signature of the first key segment share_key_b, and stores the first key segment share_key_b in a cloud database after encryption. The first key segment share_key_a is stored in a dedicated storage area RPMB of the reset device or on the REE side after encryption.

Figure 7:
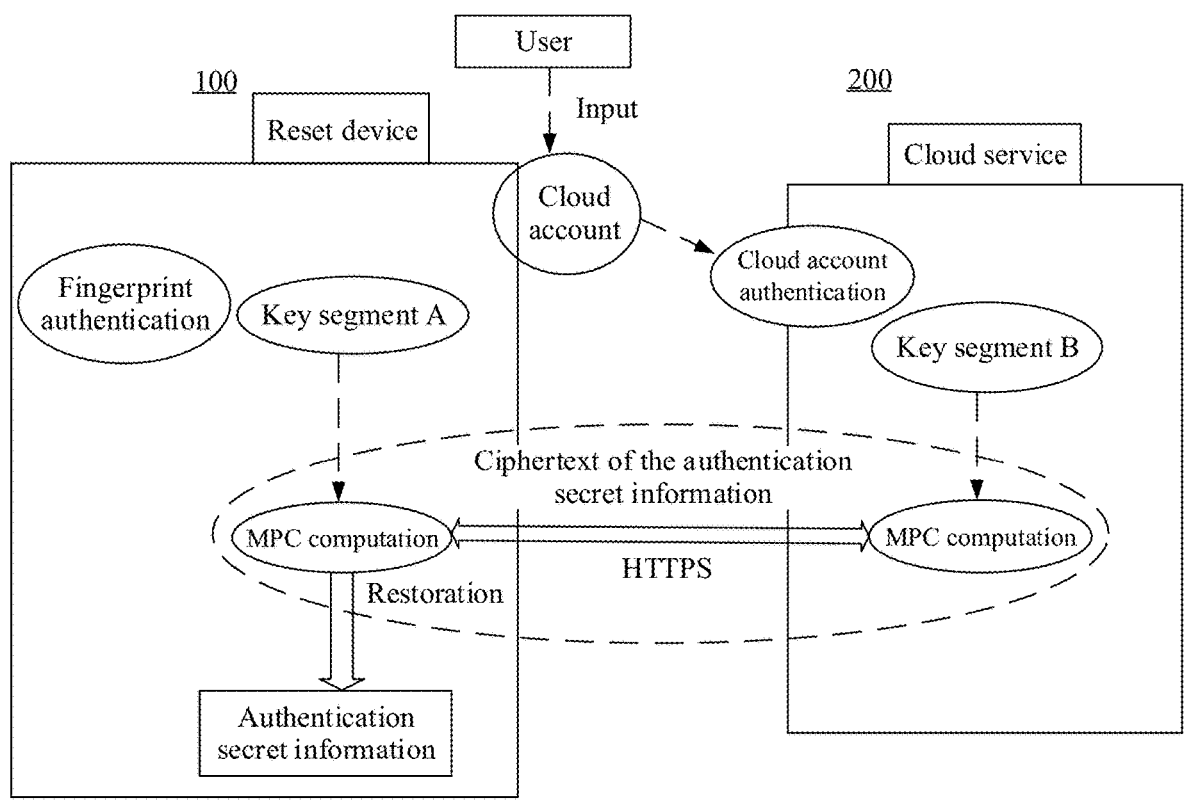
FIG. 7 is a flowchart of decrypting authentication secret information in an authentication credential protection system according to an embodiment of this application.

FIG. 7 shows an authentication secret information restoration phase.

An HTTPS security connection channel is established between the cloud service and the reset device.

The unidirectional HTTPS security channel (cloud service authentication) is established between the reset device and the cloud service.

After the user enters the cloud account and password on the reset device, the cloud account and password are transmitted to the cloud service through the HTTPS for the identity authentication (the user authentication).

The cloud service authenticates the user account and password, enables MPC computation, and waits for two parties to participate in the multi-party computation.

After a fingerprint of the reset device is authenticated, the MPC computation is enabled. The two parties officially start decryption computation MPC_AES. The reset device is on the REE side, and authentication secret information is restored.

The user enters a new lock screen password in a user interface, as described above.

Trusted devices (such as mobile phones, tablets, and PCs) can be replaced with auxiliary accessories (such as smart watches and wrist bands).

Another system architecture in this embodiment of this application includes a first device 100 and a third device 300.

Figure 8:
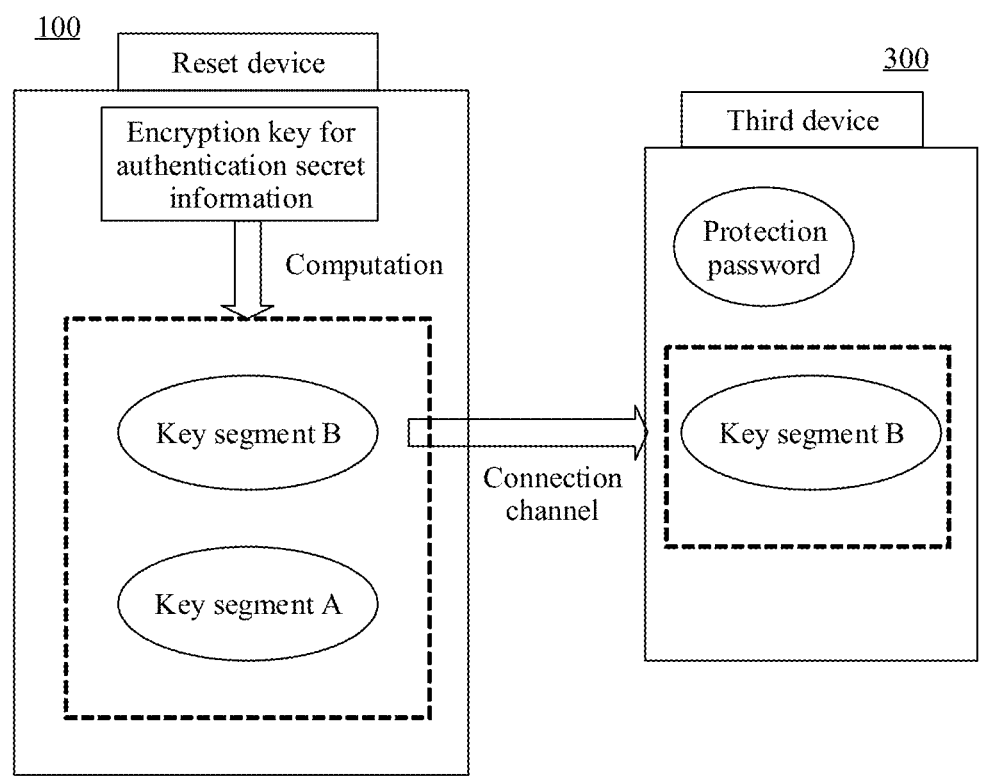
FIG. 8 is a flowchart of splitting an encryption key of an authentication credential protection system according to an embodiment of this application.

The first device 100 is the reset device in FIG. 1, and the third device 300 is a mobile phone, a tablet computer, or the like. In addition, structures of the first device 100 and the third device 300 are the same as the foregoing structures. A difference only lies in that the first device 100 splits an encryption key into two parts, but during storage, the two first key segments are respectively stored on the first device 100 and the third device 300. The first device 100 stores one first key segment, and the third device 300 stores one first key segment. As shown in FIG. 8, a specific process is as follows:

A connection channel is established between the reset device and the third device 300.

A user enters a lock screen password on the reset device, the lock screen password and hardware secret information generate authentication secret information. A symmetric key is randomly generated as an encryption key for the lock screen password, the encryption key is used to encrypt the authentication secret information, and an obtained ciphertext is stored on the reset device.

The encryption key is split into two first key segments: share_key_a /share_key_b. The first key segments are respectively stored on the reset device (the first device 100) and the tablet computer (the third device 300).

After receiving the first key segment share_key_b, the tablet computer authenticates a signature of the first key segment share_key_b, and stores the first key segment share_key_b locally after encryption. The first key segment share_key_a is stored in a dedicated storage area RPMB of the reset device or on an REE side after encryption.

After the third device 300 receives share_key_b, a dialog box is displayed, prompting the user to reject or accept.

After obtaining authorization from the user, the third device 300 authenticates the signature of share_key_b, and stores share_key_b on the third device 300 after decryption (a hardware key or a protection password is encrypted).

share_key_a is stored in the dedicated storage area RPMB of the first device 100 or on the REE side after the encryption.

Figure 9:
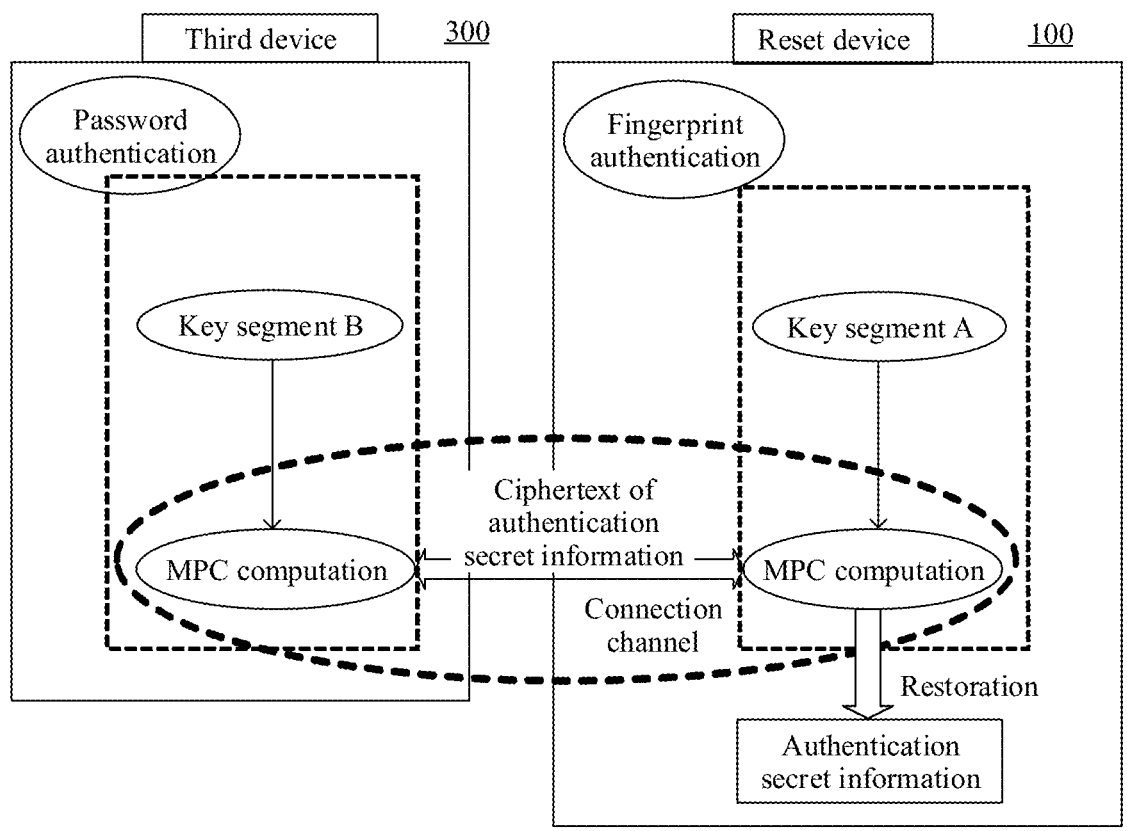
FIG. 9 is a flowchart of decrypting authentication secret information in an authentication credential protection system according to an embodiment of this application.

FIG. 9 shows an authentication secret information restoration (decryption) phase.

In a local operation scenario, the connection channel is established between the reset device and the third device 300.

After performing authentication (on a trusted mobile phone lock screen password or a trusted PC protection password), the third device 300 starts MPC computation, and waits for two parties to participate in decryption computation MPC_AES.

After a fingerprint of the reset device is authenticated, the MPC computation is enabled. The two parties officially start the decryption computation MPC_AES. The reset device is on the REE side, and the authentication secret information is restored (decrypted).

The user enters a new password in a user interface, uses both old and new lock screen passwords as parameters, and invokes a lock screen password change function to reset the lock screen password.

A first processing module 102 of the first device 100 is further configured to: after the authentication secret information is decrypted, transfer the old authentication secret information and new authentication secret information to a TEE as parameters, the TEE compares the old authentication secret information with stored authentication secret information, and if the two pieces of authentication secret information match, the TEE replaces the stored authentication secret information with the new authentication secret information.

The third device 300 (such as a mobile phone, a tablet computer, and a PC) can be replaced with an auxiliary accessory (such as a smart watch and a wrist band).

It can be learned from the foregoing description that secret information or a computing result of the secret information is jointly computed by auxiliary computing parties, and intrusion of some auxiliary computing parties does not cause leakage of the secret information or the computing result of the secret information. The secret information or the computing result is displayed only on a specified calculation party to ensure security of the secret information.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An authentication credential protection method, comprising:
    generating authentication secret information by combining a lock screen password and hardware secret information of a first device;
    randomly generating, by the first device, a symmetric key;
    encrypting the authentication secret information using the symmetric key as an encryption key for the authentication secret information;
    storing the encrypted authentication secret information on the first device;
    splitting the encryption key into at least two first key segments by using a splitting algorithm, wherein one of the at least two first key segments is stored on the first device; and
    sending, by the first device, another of the at least two first key segments to a trusted device different than the first device.

2. The authentication credential protection method according to claim 1, wherein the splitting algorithm comprises a secure multi-party data splitting algorithm.

3. The authentication credential protection method according to claim 1, wherein the trusted device comprises a second device and a third device, and the at least two first key segments include three first key segments, and the sending, by the first device, the another one of the at least two first key segments to the trusted device comprises:
    sending, by the first device, two key segments of the three first key segments to the second device and the third device in a one-to-one correspondence for storage.

4. The authentication credential protection method according to claim 1, wherein the trusted device comprises a second device, and the at least two first key segment includes two first key segments and wherein sending, by the first device, the other one of the at least two first key segments to the trusted device comprises:
    sending, by the first device, one of the at least two first key segments to the second device.

5. The authentication credential protection method according to claim 1, wherein the first device is connected to the trusted device through a secure channel.

6. The authentication credential protection method according to claim 5, wherein the method further comprises:
    performing user identity information authentication on the trusted device, and after user identity information is determined, receiving a first one of the at least two first key segments sent by the first device.

7. The authentication credential protection method according to claim 1 wherein the method further comprises:
    performing secure multi-party computation between the trusted device and the first device by using the at least two first key segments respectively stored on the trusted device and the first device as key division input to the secure multi-party computation, and decrypting the encrypted authentication secret information on the first device.

8. The authentication credential protection method according to claim 7, wherein the method further comprises:
    before performing the multi-party computation, performing the user identity information authentication on the trusted device, and after the user identity information is determined, performing the secure multi-party computation between the trusted device and the first device by using the at least two first key segments respectively stored on the trusted device and the first device as the key division input to the secure multi-party computation.

9. The authentication credential protection method according to claim 7, wherein the method further comprises:
    resetting the lock screen password, and generating new authentication secret information based on the reset lock screen password and the hardware secret information of the first device.

10. The authentication credential protection method according to claim 9, wherein the method further comprises:
    randomly generating, by the first device, a new symmetric key, and using the new symmetric key as a new encryption key for the new authentication secret information; and comparing the authentication secret information obtained through decryption of the encrypted authentication secret information with authentication secret information stored in a Trusted Execution Environment (TEE), and when the authentication secret information obtained through decryption of the encrypted authentication secret information and the authentication secret information stored in the TEE match, replacing the authentication secret information obtained through decryption of the encrypted authentication secret information with the authentication secret information in the TEE.

11. The authentication credential protection method according to claim 10, wherein the method further comprises:
splitting a new encryption key into at least two second key segments by using the splitting algorithm, wherein one of the at least two second key segments is stored on the first device; and
sending, by the first device, an other one of the at least two second key segments to the trusted device.

12. An authentication credential protection system, comprising:
a first device, comprising a first processing module, configured to:
generate first authentication secret information by combining a lock screen password and hardware secret information of a first device;
randomly generate a symmetric key;
use the symmetric key as an encryption key for the first authentication secret information to encrypt the first authentication secret information; and
split the encryption key into at least two first key segments by using a splitting algorithm;
a first storage module, configured to store the encrypted first authentication secret information and one key segment of the at least two first key segments; and
a first communications module, configured to send an other key segment of the at least two first key segments to a trusted device different than the first device; and
wherein the trusted device is configured to receive and store the one key segment of the at least two first key segments sent by the first device.

13. The authentication credential protection system according to claim 12, wherein the splitting algorithm comprises a secure multi-party data splitting algorithm.

14. The authentication credential protection system according to claim 12, wherein:
the trusted device comprises a second device and a third device, and the at least two second key segments include three first key segments;
the first communications module is configured to send two of the three key segments to the second device and the third device in a one-to-one correspondence for storage.

15. The authentication credential protection system according to claim 12, wherein the trusted device comprises a second communications module, and the first communications module is connected to the second communications module through a secure channel.

16. The authentication credential protection system according to claim 15, wherein the trusted device comprises:
an authentication module, configured to authenticate user identity information; and
the second communications module is further configured to: after the user identity information is determined, receive a first one of the at least two key segments sent by the first device.

17. The authentication credential protection system according to claim 12, wherein
the trusted device comprises a second processing module;
the first processing module and the second processing module perform secure multi-party computation of Advanced Encryption Standard (MPC_AES) between the trusted device and the first device by using the at least two key segments respectively stored on the trusted device and the first device as key division input to the secure multi-party computation, and decrypt the encrypted first authentication secret information on the first device to produce decrypted first authentication secret information.

18. The authentication credential protection system according to claim 17, wherein the first processing module is further configured to: reset the lock screen password, and generate new authentication secret information based on the reset lock screen password and the hardware secret information of the first device; and transfer the first authentication secret information and the new authentication secret information to a Trusted Execution Environment (TEE) as parameters, the TEE compares the first authentication secret information with the authentication secret information stored in the TEE, and if the two pieces of authentication secret information match, the TEE replaces the authentication secret information stored in the TEE with the new authentication secret information.

19. The authentication credential protection system according to claim 18, wherein the first processing module is further configured to randomly generate a new symmetric key and use the new symmetric key as a new encryption key for the new authentication secret information.

20. The authentication credential protection system according to claim 19, wherein the first processing module is further configured to split the new encryption key into at least two second key segments by using the splitting algorithm; the first storage module, configured to store one of the at least two second key segments; the first communications module, configured to send an other one of the at least two second key segments to the trusted device.

* * * * *